United States Patent [19]
Koteles et al.

[11] Patent Number: 6,042,513
[45] Date of Patent: Mar. 28, 2000

[54] NON DESTRUCTIVE RUNAWAY PROTECTION FOR AN ELECTRIC MOTOR

[75] Inventors: John Koteles, Oxnard; Raymond J. Mason, Downey, both of Calif.; Joseph Nowosielski, Glendale Heights, Ill.

[73] Assignee: Minarik Corporation, Glendale, Calif.

[21] Appl. No.: 08/825,202

[22] Filed: Mar. 27, 1997

[51] Int. Cl.[7] .................................................. A63B 23/00
[52] U.S. Cl. ................................... 482/54; 482/4; 482/7; 482/900; 318/1
[58] Field of Search .................................. 482/1, 4, 7, 54, 482/900–902; 318/1–3, 6, 55, 56, 59, 60, 66

[56] References Cited

U.S. PATENT DOCUMENTS 5,571,062  11/1996  Saganovsky ................................ 482/4

*Primary Examiner*—Glenn E. Richman
*Attorney, Agent, or Firm*—Morland C. Fischer

[57] ABSTRACT

A runaway protection mechanism is provided which is truly nondestructive in nature and which is highly advantageous for an electric motor used in, for example, an exercise treadmill for driving its moving treadmill belt. In use, the electric motor is connected to an electric power source, such as an alternating-current wall outlet. The runaway protection mechanism includes a disconnect mechanism for disconnecting the motor from the electric power source and thereby deenergizing the motor. The runaway protection mechanism further includes a safety mechanism for comparing the actual motor speed with a desired motor speed and activating the disconnect mechanism when the actual speed exceeds the desired speed by a predetermined amount. In this manner, an orderly and nondestructive shutdown of the motor is accomplished when a fault condition is recognized.

15 Claims, 1 Drawing Sheet

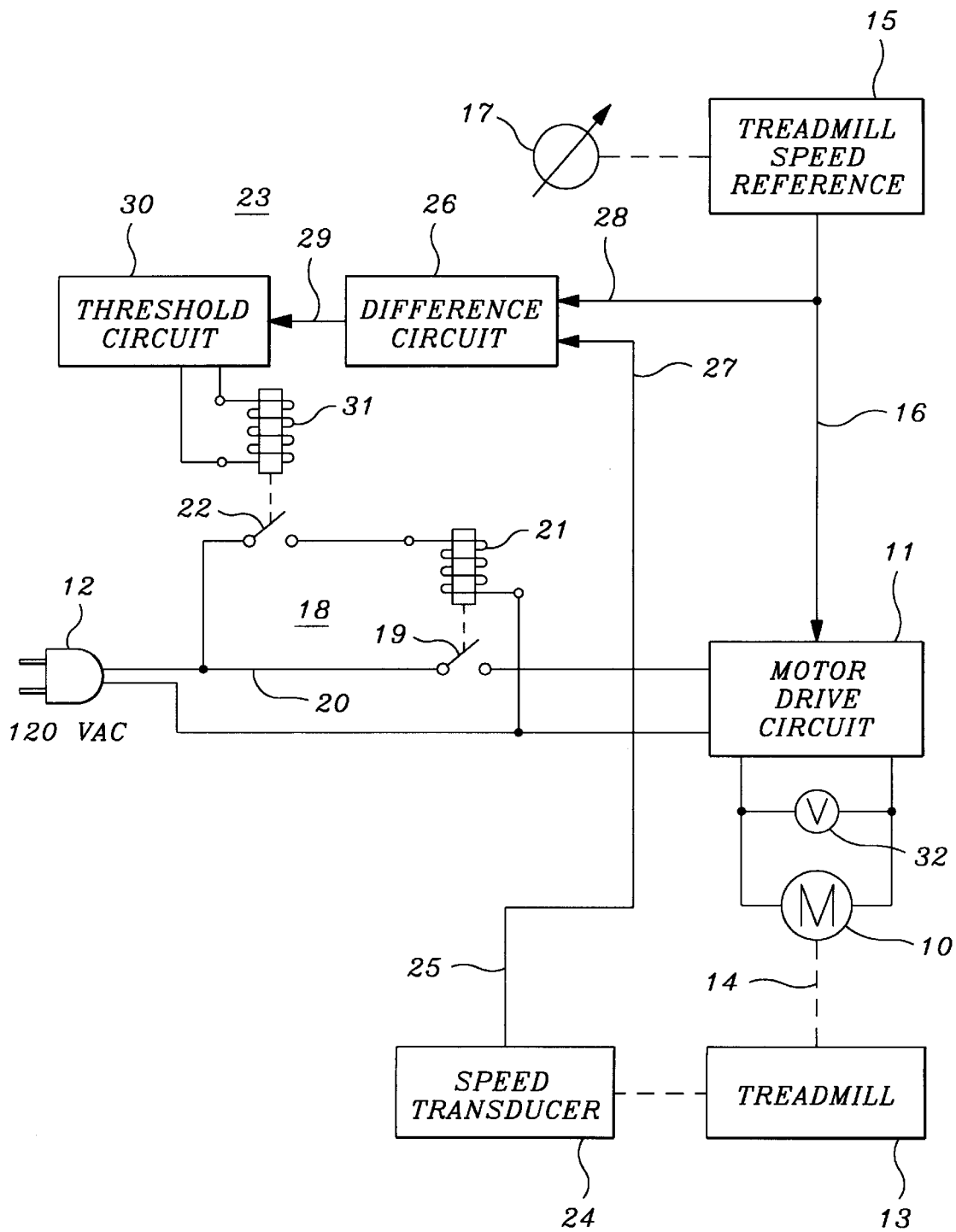

NON DESTRUCTIVE RUNAWAY PROTECTION FOR AN ELECTRIC MOTOR

TECHNICAL FIELD

This invention relates to runaway protection for electric motors, particularly electric motors which operate exercise machines such as treadmills.

BACKGROUND OF THE INVENTION

Recently, the need in the exercise treadmill industry for a runaway prevention mechanism was perceived. Runaway may be caused by a motor drive failure. When a failure of that nature occurs, the motor control circuit may output full voltage, thereby causing the motor and, hence, the treadmill to run at full speed with no speed control whatsoever. This was perceived as a dangerous situation. Many treadmill manufacturers subsequently added a runaway prevention circuit to their motor drives.

This runaway prevention circuit was usually a run-of-the-mill "crowbar" circuit of the type found in circuit application books published by various semiconductor manufacturers. A typical "crowbar" circuit as applied to an exercise treadmill is shown in U.S. Pat. No. 5,571,062, issued on Nov. 5, 1996 to Abraham Saganovsky. This patent to Saganovsky shows a silicon-controlled rectifier (SCR) connected across the power terminals of the motor and the output of the speed control circuit for shorting out the motor and the output of the speed control circuit when an abrupt increase in voltage is detected at the output of the speed control circuit.

A problem with the "crowbar" circuit, however, is that it is destructive. When the circuit detects an excessive voltage at the speed control output, it creates a direct short (i.e., "crowbar") across the motor terminals and the output terminals of the speed control circuit. This constitutes a dead short across the line and blows a protective fuse which is normally used. In the process, the "crowbar" circuit usually destroys the rest of the motor speed control circuit.

Additionally, shorting the motor terminals causes an uncontrolled dynamic braking of the motor. This will sometimes damage the motor by causing such things as irreversible demagnetization, lamination melting, spun bearings and the like. Even worse, it could cause the belt of the treadmill to instantly stop, throwing the person on the treadmill forward and injuring him in the process.

It is also the case that the motor might run at full speed for reasons other than failure of the motor speed control circuit. So, if a condition occurs in which the motor speed control is told to go to full output, the destructive runaway prevention circuit (i.e., "crowbar") is activated. This successfully prevents the apparent runaway, but simultaneously destroys the drive circuit and maybe the motor.

SUMMARY OF THE INVENTION

The present invention provides a runaway protection mechanism which is truly nondestructive in nature and which is highly advantageous for an electric motor used in, for example, an exercise treadmill for driving its moving treadmill belt. In use, the electric motor is connected to an electric power source, such as an alternating-current wall outlet. The runaway protection mechanism includes a disconnect mechanism for disconnecting the motor from the electric power source and thereby deenergizing the motor. The runaway protection mechanism further includes a safety mechanism for comparing the actual motor speed with a desired motor speed and activating the disconnect mechanism when the actual speed exceeds the desired speed by a predetermined amount. In this manner, an orderly and nondestructive shutdown of the motor is accomplished when a fault condition is recognized.

For a better understanding of the present invention, together with other and further advantages and features thereof, reference is made to the following description taken in connection with the accompanying drawing, the scope of the invention being pointed out in the appended claims.

BRIEF DESCRIPTION OF THE DRAWING

Referring to the drawing, the single FIGURE thereof is a schematic block diagram of a representative embodiment of a nondestructive runaway protection mechanism constructed in accordance with the present invention.

DETAILED DESCRIPTION OF THE ILLUSTRATED EMBODIMENT

Referring to the drawing, the runaway protection mechanism there shown includes an electric motor 10 which is adapted to be coupled to an electric power source for energizing the motor. More particularly, the electric motor 10 has a motor drive circuit 11 connected thereto which is adapted to be connected to an electric power source via wall outlet plug 12. When plug 12 is plugged into a "live" wall outlet, the drive circuit 11, if turned on, supplies electric energy to the motor 10 to cause rotation of the rotor and drive shaft of motor 10. Motor drive circuit 11 includes appropriate speed control circuitry for controlling the speed of motor 10.

The drive shaft of motor 10 is mechanically coupled to the movable mechanism of an exercise machine represented by an exercise treadmill 13. More particularly, the motor drive shaft is coupled to the movable treadmill belt of treadmill 13 for causing movement of the treadmill belt. This mechanical linkage is represented by broken line 14.

An adjustable speed reference mechanism 15 is connected to a control signal input of the motor drive circuit 11 by way of line 16 for supplying a signal representing the desired motor speed to the motor drive circuit 11. A control knob 17 may be mechanically connected to a potentiometer in the treadmill speed reference circuit 15 for adjusting the value of the desired speed signal on line 16 for causing the motor drive circuit 11 to run the motor 10 and, hence, the treadmill belt at a desired speed. Alternatively, the control knob 17 may be replaced by speed selection circuitry in the treadmill speed reference circuit 15.

The runaway protection mechanism of the present invention includes a disconnect mechanism 18 for disconnecting the motor drive circuit 11 from the electric power source represented by the wall outlet into which the power plug 12 is plugged. In the illustrated embodiment, the disconnect mechanism 18 includes a switching element 19 connected in series with the connection (line 20) between the electric power source (wall outlet) and the motor drive circuit 11. Opening of the switching element 19 breaks the power supplying circuit and thereby causes a deenergizing of motor 10.

The disconnect mechanism 18 further includes a switch control mechanism responsive to the output of a safety mechanism for causing an opening of the switching element 19 when the actual motor speed exceeds the desired motor speed by a predetermined amount. This switch control mechanism includes a relay coil 21, the armature of which is mechanically connected to the switching element or relay switch 19 for opening the switch 19. This switch control mechanism also includes a control switch 22 connected in circuit with the relay coil 21 and responsive the occurrence of a disconnect activation signal at the output of the safety mechanism for switching to its open position and thereby causing the relay coil 21 to be deenergized. This, in turn, causes the relay switch 19 to open.

The runaway protection mechanism of the present invention further includes a safety mechanism 23 for comparing the actual motor speed with a desired motor speed and activating the disconnect mechanism 18 when the actual motor speed exceeds the desired speed by a predetermined amount. In the illustrated embodiment, the desired motor speed is represented by the desired speed signal produced by treadmill speed reference circuit 15 and appearing on line 16. The actual motor speed is represented by the speed signal produced by a speed transducer 24 which is mechanically coupled to the movable treadmill belt of the treadmill 13. This actual speed signal appears on output line 25 of the speed transducer 24. While these two signals are spoken of in terms of treadmill speeds, they are nevertheless representative of the corresponding motor speeds because of the direct relationship between the treadmill speed and the motor speed.

The safety mechanism 23 includes a difference circuit 26 having a first input 27 coupled to the actual motor speed circuit represented by speed transducer 24 and a second input 28 coupled to the desired motor speed circuit represented by treadmill speed reference circuit 15. The difference circuit 26 is responsive to these actual and desired speed signals for producing at its output 29 a difference signal representing the difference between the actual motor speed and the desired motor speed.

The safety mechanism 23 further includes a threshold circuit 30 responsive to the difference signal from difference circuit 26 for producing a disconnect activation signal (zero current) which is applied to a control relay coil 31 when the difference signal exceeds a predetermined amount. The armature of control relay coil 31 is mechanically connected to the control switch 22. When the disconnect activation signal (zero current) is supplied to the control relay coil 31, the control switch 22 moves to its open position. This disables or stops the flow of electric current through the primary relay coil 21 to thereby cause the primary relay switch 19 to move to its open position, thereby disconnecting the motor drive circuit 11 from the electric power source. This deenergizes the motor 10 which, in turn, slows down and brings to a halt the movable treadmill belt in treadmill 13. Thus, the treadmill belt is stopped in an orderly manner and nobody is injured.

During the normal operation of treadmill 13, both of relay coils 21 and 31 are energized and both of switches 19 and 22 are closed. When an excessive speed of treadmill 13 is detected, threshold circuit 30 discontinues the flow of electrical current through the control coil 31, which enables the control switch 22 to move to its open position. This, in turn, discontinues the flow of electrical current through the primary relay coil 21, thus enabling the primary power switch 19 to move to its open position. This disconnects the motor drive circuit 11 from the electric power source and brings the motor 10 to a halt.

The switch arrangement just described provides a maximum of fail-safe protection in that the unwanted occurrence of an open circuit condition in either coil winding will also cause the motor 10 to be deenergized. In some cases, however, there may be other factors which make a different mode of switch operation more attractive. Thus, it is not intended to limit the invention to the particular mode of switch operation depicted in the illustrated embodiment.

The threshold circuit 30 may be comprised of, for example, a threshold-triggered bistable circuit or a Schmitt trigger circuit. The threshold level in circuit 30 is, preferably, pre-adjusted at the factory. This pre-adjustment allows the manufacturer to pre-set an acceptable over-limit value and, if desired, an acceptable length of time for which an unsatisfactory condition may exist before the orderly shutdown commences.

The control relay provided by switch 22 and coil 31 may be replaced, if desired, by a semiconductor switching device or the like. Similarly, the power relay provided by switch 19 and coil 21 may be replaced by some other form of positive disconnect mechanism. In addition, coils 21 and 31 and switches 19 and 22 may be combined as a single device. In any event, the opening of power switch 19 or other power disconnect element does not short out anything. It does not cause fuses or circuit breakers to blow. It does not damage the motor 10 or cause abrupt changes in the state of the treadmill belt 13. Consequently, when the failure is resolved, there is no need to replace the motor 10 or the drive circuit 11, unless of course it was one of these items that failed.

If desired, the analog circuitry represented by difference circuit 26 and threshold circuit 30 may be replaced by a microprocessor which is properly programmed to provide these functions. Such microprocessor may also be used to provide other functions normally associated with an exercise treadmill.

There are several choices in how to obtain the actual speed signal provided by speed transducer 24. A speed transducer may be coupled to the treadmill 13, as shown. Alternatively, a speed transducer may be coupled to the drive shaft of the motor 10. As a third choice, the voltage 32 across the terminals of the motor 10 may be used as a measure of the actual motor speed. Also, the speed control knob 17 may be replaced by digital speed selection circuitry in the treadmill speed reference circuit 15.

While specifically described for the case of a treadmill type exercise machine, it is to be understood that the present invention may be used in connection with other types of exercise machines. For example, the exercise machine may be an exercise bike, in which case the movable exercise mechanism is a movable pedal mechanism. Or, alternatively, the exercise machine may take the form of a stair climber machine and the movable mechanism may be a set of stair climber pedals.

While there have been described what are at present considered to be preferred embodiments of this invention, it will be obvious to those skilled in the art that various changes and modifications may be made therein without departing from the invention and it is, therefore, intended to cover all such changes and modifications as come within the true spirit and scope of the invention.

What is claimed is:

1. A runaway protection mechanism for an electric motor having a motor drive circuit adapted to be connected to an electric power source for enabling the drive circuit to supply electric energy to the motor, said runaway protection mechanism comprising:

a disconnect mechanism for disconnecting the motor drive circuit from the electric power source and thereby deenergizing the motor; and a safety mechanism for comparing the actual motor speed with a desired motor speed and generating an output signal for activating the disconnect mechanism when the actual speed exceeds the desired speed by a predetermined amount, said disconnect mechanism including a relay switch connected between the motor drive circuit and the power source, a relay coil to open said relay switch, and a control switch coupled to said relay coil and responsive to the generation of the output signal from said safety mechanism for causing said relay coil to be energized and said relay switch to open to disconnect the motor drive circuit from the power source and thereby deenergize the motor.

2. A runaway protection mechanism in accordance with claim 1 wherein the safety mechanism includes:

a difference circuit for producing a difference signal representing the difference between the actual motor speed and the desired motor speed; and a threshold circuit responsive to the difference signal for generating said output signal for activating the control switch of said disconnect mechanism.

3. A runaway protection mechanism in accordance with claim 1 wherein the runaway protection mechanism further includes:

circuitry for supplying a signal representing the actual motor speed; and circuitry for supplying a signal representing the desired motor speed; and the safety mechanism includes:

a difference circuit having a first input coupled to the actual motor speed circuitry and a second input coupled to the desired motor speed circuitry, such difference circuit being responsive to the actual and the desired speed signals for producing a difference signal representing the difference between the actual motor speed and the desired motor speed; and a threshold circuit responsive to the difference signal for producing said output signal to be supplied to the control switch of said disconnect mechanism for causing a disconnection of the motor drive from the electric power source.

4. An exercise machine for a human being comprising:

a movable exercise mechanism;

an electric motor coupled to the exercise machine for causing movement thereof;

a motor drive circuit connected to the electric motor to be connected to an electric power source for enabling the drive circuit to supply electric energy to the motor;

an adjustable speed reference mechanism for supplying a desired variable speed signal to the motor drive circuit for causing said motor drive circuit to run the motor at a speed corresponding to said desired variable speed signal;

a disconnect mechanism for disconnecting the motor drive circuit from the electric power source and thereby deenergizing the motor; and a safety mechanism for comparing a signal representing the actual motor speed with a signal representing the desired speed signal and activating the disconnect mechanism when the actual speed signal exceeds the desired speed signal by a predetermined amount.

5. An exercise machine in accordance with claim 4 wherein:

the exercise machine is an exercise treadmill;

and the movable exercise mechanism is a movable treadmill belt.

6. An exercise machine in accordance with claim 4 wherein:

the exercise machine is an exercise bike;

and the movable exercise mechanism is a movable pedal mechanism.

7. An exercise machine in accordance with claim 4 wherein:

the exercise machine is a stair climber;

and the movable exercise mechanism is a set of movable pedals.

8. Runaway protection for an electric motor to be coupled to an electric power source for energizing the motor, such runaway protection comprising:

means by which to selectively adjust the speed of the motor to a desired speed lying in a range of variable motor speeds while the motor is coupled to the power source and energized thereby;

a sensor by which to detect the actual speed of the motor;

a comparison circuit to compare the desired and actual speeds of the motor and generate a disconnect activation signal should the difference between the actual motor speed and the desired motor speed be greater than a predetermined amount; and a switch connected between the motor and the power source, said switch responsive to said disconnect activation signal to disconnect the motor from the power source and thereby deenergize the motor.

9. Runaway protection according to claim 8 wherein said means by which to selectively adjust the speed of the motor to a desired speed is a rotatable knob and a motor drive circuit coupled to said motor drive circuit to control the speed of the electric motor, said desired motor speed corresponding to the position to which said rotatable knob is rotated.

10. Runaway protection according to claim 8 wherein said switch connected between the motor and the power source is a relay switch, said runaway protection further comprising a relay coil coupled to said relay switch to cause said relay switch to open to disconnect the motor from the power source, and a control switch responsive to said disconnect activation signal from said comparison circuit for causing said relay coil to be energized and said relay switch to open.

11. Runaway protection according to claim 8 wherein said sensor by which to detect the actual speed of the motor is a speed transducer connected to an input of said comparison circuit.

12. Runaway protection according to claim 11 wherein said motor is coupled to a treadmill having a movable treadmill belt, said speed transducer coupled to said treadmill belt at which to detect the actual speed of the motor.

13. Runaway protection according to claim 11 wherein said speed transducer is coupled to the drive shaft of the motor at which to detect the actual speed of the motor.

14. Runaway protection according to claim 8 wherein said comparison circuit includes a difference circuit for determining the difference between the actual and desired motor speeds and a threshold circuit responsive to the difference between said actual and desired motor speeds for generating said disconnect activation signal when said difference is greater than said predetermined amount.

15. Runaway protection according to claim 8 wherein said switch non-destructively deenergizes the motor in response to said disconnect activation signal generated by said comparison circuit, such that the motor is not damaged when it is disconnected from the power source.

* * * * *